United States Patent [19]

Sugio et al.

[11] 4,427,814
[45] Jan. 24, 1984

[54] POLYPHENYLENE ETHER RESIN COMPOSITION HAVING IMPROVED HEAT STABILITY

[75] Inventors: Akitoshi Sugio, Ohmiya; Masanobu Masu, Tokyo; Masao Okabe, Abiko; Yukio Sasaki, Tokyo; Kozo Ishiyama, Yokkaichi, all of Japan

[73] Assignee: Mitsubishi Gas Chemical Company, Inc., Japan

[21] Appl. No.: 476,016

[22] Filed: Mar. 15, 1983

Related U.S. Application Data

[63] Continuation-in-part of Ser. No. 240,367, Mar. 4, 1981, abandoned.

[30] Foreign Application Priority Data

Mar. 10, 1980 [JP] Japan .................................. 55-30051

[51] Int. Cl.³ .......................... C08K 5/50; C08K 5/53
[52] U.S. Cl. .................................... 524/126; 525/92; 525/135; 525/152
[58] Field of Search ......................................... 524/126

[56] References Cited

U.S. PATENT DOCUMENTS 4,075,163  2/1978  Hofer et al. ........................ 524/126
4,143,028  3/1979  Spivack .............................. 524/117
4,154,719  5/1979  Abolins et al. ..................... 524/100

Primary Examiner—John Kight, III
Assistant Examiner—Kriellion Morgan
Attorney, Agent, or Firm—Wenderoth, Lind & Ponack

[57] ABSTRACT

A polyphenylene ether resin composition having improved heat stability and good color, said composition comprising a polyphenylene ether resin matrix, and dispersed therein, a diphosphonite of the formula

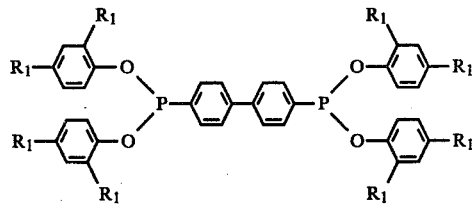

wherein $R_1$ groups are identical or different and each represents a linear or branched alkyl group having 1 to 10 carbon atoms.

14 Claims, No Drawings

POLYPHENYLENE ETHER RESIN COMPOSITION HAVING IMPROVED HEAT STABILITY

This application is a continuation-in-part application of the pending application Ser. No. 240,367 filed on Mar. 4, 1981, now abandoned.

This invention relates to a polyphenylene ether resin composition having improved heat stability and good color.

Polyphenylene ethers are known resins which are disclosed, for example, in U.S. Pat. Nos. 3,306,874, 3,306,875, 3,257,357, 3,257,358 and 4,011,200 and Japanese Laid-Open Patent Publication No. 126800/1975. Since polyphenylene ethers having a molecular weight above a certain limit have a high softening point, they are useful in applications which require heat stability. In formulating a polyphenylene ether into resin compositions, however, its high softening point makes it necessary to use higher kneading and extruding temperatures than in the case of other versatile resins, and high temperatures are also required in molding the resin compositions. Moreover, molded articles of the polyphenylene ether resin compositions are frequently used at relatively high temperatures over long periods of time in contrast to those from versatile resins.

Because polyphenylene ethers are relatively unstable to heat as is well known, they undergo degradation during extrusion and molding at high temperatures, and result in polyphenylene ether resin compositions and molded articles having degraded properties and/or discoloration. These deleterious effects limit widespread utilization of polyphenylene ether resin compositions, and it has been desired to remedy these defects, particularly to improve their heat stability at high temperatures.

Various methods have already been proposed for the stabilization of resin compositions containing polyphenylene ethers. These methods are classified into a group involving capping the hydroxyl groups present at the terminals of the polyphenylene ether molecule by acylation, etc., and a group comprising adding various stabilizers to polyphenylene ethers.

Known stabilizers used in the latter group include, for example, benzoates (U.S. Pat. No. 3,379,875), hexaalkylphosphoric triamides or combinations thereof with other compounds (U.S. Pat. Nos. 3,414,536, 3,420,792, 3,429,850, 3,465,062, 3,472,814, 3,483,271, 3,792,121 and 3,816,562), octa-alkylpyrophosphoramides or combinations thereof with other compounds (U.S. Pat. No. 3,450,670), amines (U.S. Pat. Nos. 3,563,934 and 3,956,423), phosphites or hydrazines (U.S. Pat. No. 3,639,334), alkanolamines (U.S. Pat. No. 3,761,541), arylphosphonic amides (U.S. Pat. No. 3,792,120), sterically hindered phenols having a triazine or isocyanuric ring (U.S. Pat. No. 4,154,719), substituted dicarboxylic acid dihydrazides (U.S. Pat. No. 3,954,904), high-molecular-weight phosphites or combinations thereof with other compounds (U.S. Pat. No. 3,952,072), amides (Japanese Patent Publication No. 29748/1969), metal dithiocarbamates (Japanese Patent Publication Nos. 19395/1970 and 8352/1970), carboxylic acid anhydrides (Japanese Patent Publication No. 29,750/1969), phosphites (Japanese Patent Publication No. 29,751/1969), sterically hindered phenols or combinations thereof with other compounds (Japanese Patent Publication Nos. 43473/1971, 42029/1971, 42030/1971, 42031/1971, 42032/1971, and 42033/1971), sterically hindered phenols having one amide linkage in the molecule (Japanese Patent Publication No. 24782/1971), sterically hindered phenols having one ester linkage in the molecule (Japanese Patent Publication No. 38623/1973), high-molecular-weight phosphites (Japanese Laid-Open Patent Publication Nos. 23846/1974, 31755/1974 and 40476/1975), and combinations of phosphorous acid amides and boron compounds (Japanese Laid-Open Patent Publication No. 129750/1974).

Moreover, U.S. Pat. No. 4,143,028 proposes alkylated 1,1'-biphenyl-2,2'-diylphosphonites of the formula

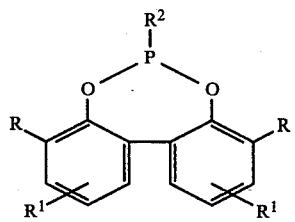

wherein
R is an alkyl group of 1 to 18 carbon atoms,
$R^1$ is hydrogen or an alkyl group of 1 to 18 carbon atoms, and
$R^2$ is an alkyl group of 1 to 18 carbon atoms, phenyl, phenyl substituted with up to 3 alkyl groups each having 1 to 8 carbon atoms, or a group of the formulae

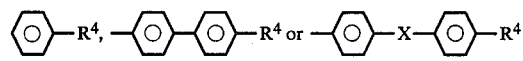

where $R^4$ is of the formula

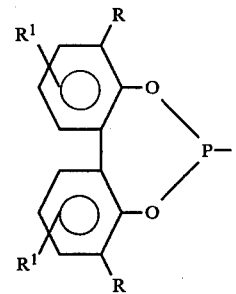

and X is O or S as light stabilizers and/or antioxidants in a wide range of organic polymers.

In the phosphonites of the above formula, the adjacent two phenyl rings are directly linked in the 2- and 2'-positions. Therefore, there is a structural characteristic that the rotations of the two phenyl rings are completely restricted.

None of these numerous stabilizers previously proposed have been conducive to the provision of polyphenylene ether resin compositions having fully satisfactory heat stability and color, particularly at high temperatures, in practical applications.

It is an object of this invention therefore to improve the heat stability and color of a polyphenylene ether resin composition.

Another object of this invention is to provide a polyphenylene ether resin composition having excellent heat stability and good color at high temperatures.

Still another object of this invention is to provide a polyphenylene ether resin composition showing inhibited degradation against a long heat history at high temperatures, which can withstand high temperatures during kneading, extrusion and molding and give molded articles having excellent heat stability and good color in long-term use at high temperatures.

Other objects and advantages of this invention will become apparent from the following description.

In accordance with this invention, these objects and advantages are achieved by a polyphenylene ether resin composition having improved heat stability and good color, said composition comprising a polyphenylene ether resin matrix and dispersed therein, a diphosphonite of the following formula (I)

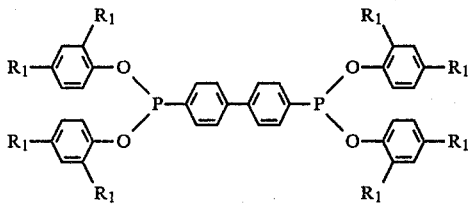

wherein $R_1$ groups are identical or different and each represents a linear or branched alkyl group having 1 to 10 carbon atoms.

According to this invention, there is preferably provided a polyphenylene ether resin composition having improved heat stability and good color, comprising a polyphenylene ether resin matrix and dispersed therein, both the aforesaid disphosphonite and a sterically hindered phenol.

U.S. Pat. No. 4,075,163 discloses the compound of the formula (I) as a stabilizer but not a polyphenylene ether resin. Thus, said U.S. Patent does not teach the stabilization of the polyphenylene ether resin.

The polyphenylene ether resin forming the resin matrix in the composition of this invention can be a polyphenylene ether homopolymer or copolymer obtained by polycondensing at least one mononuclear phenol of the formula

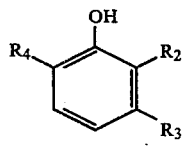

wherein $R_2$, $R_3$ and $R_4$, independently from each other, represent a hydrogen atom or an alkyl group having 1 to 3 carbon atoms, provided that at least one of $R_2$ and $R_4$ is an alkyl group having 1 to 3 carbon atoms, or a grafted polyphenylene ether obtained by graft-polymerizing such a polyphenylene ether with a vinyl aromatic compound.

Methods for producing these polyphenylene ethers are well known per se.

Examples of the mononuclear phenols of general formula (II) include 2,6-dimethylphenol, 2,6-diethylphenol, 2,6-dipropylphenol, 2-methyl-6-ethylphenol, 2-methyl-6-propylphenyl, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, and 2,6-dimethyl-3-propylphenol.

Polyphenylene ethers derived from these mononuclear phenols, therefore, include homopolymers such as poly(2,6-dimethyl-1,4-phenylene)ether, poly(2,6-diethyl-1,4-phenylene)ether, poly(2,6-dipropyl-1,4-phenylene) ether, poly(2-methyl-6-ethyl-1,4-phenylene)ether, poly(2-methyl-6-propyl-1,4-phenylene)ether, and poly(2-ethyl-6-propyl-1,4-phenylene)ether; and copolymers such as a 2,6-dimethylphenol/2,3,6-trimethylphenol copolymer (which denotes a polyphenylene ether copolymer derived from 2,6-dimethylphenol and 2,3,6-trimethylphenol, and in the following description polyphenylene ether copolymers are represented in the same manner), a 2,6-dimethylphenol/2,3,6-triethylphenol copolymer, a 2,6-diethylphenol/2,3,6-trimethylphenol copolymer and a 2,6-dipropylphenol/2,3,6-trimethylphenol copolymer.

The grafted polyphenylene ethers used equally to these homopolymers and copolymers in this invention are obtained by grafting vinyl aromatic compounds such as styrene, alpha-methyl-styrene, vinyltoluene and vinylxylene to these homopolymers or copolymers, and include, for example, styrene-grafted poly(2,6-dimethyl-1,4-phenylene)ether, and a styrene-grafted 2,6-dimethylphenol/2,3,6-trimethylphenol copolymer.

Preferably, such grafted polymers have a grafting ratio of about 10 to about 50%, especially about 20% to about 40%.

Among these polyphenylene ethers, poly(2,6-dimethyl-1,4-phenylene)ether, a 2,6-dimethylphenol/2,3,6-trimethylphenol copolymer, and grafted polyphenylene ethers obtained by grafting styrene to such polymers are especially preferred for use in this invention.

The resin matrix in the composition of this invention may be composed of such a polyphenylene ether alone, or a mixture of it with another polymer. The other polymer may be a thermoplastic resin or an elastomer.

The thermoplastic resin as referred to herein is a resin containing at least 25% by weight of a recurring structural unit of the following general formula (III)

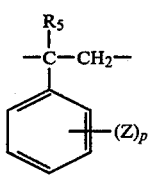

wherein $R_5$ represents a hydrogen atom or a lower alkyl group, Z represents a halogen atom or a lower alkyl group, and p is 0 or a positive integer of 1 to 3, in the polymer chain.

The lower alkyl group for $R_8$ and Z is, for example, methyl or ethyl, and examples of the halogen atom for Z are chlorine and bromine.

Examples of such a thermoplastic resin are polystyrene, a rubber-modified polystyrene (high-impact polystyrene), a styrene/butadiene copolymer, a styrene/butadiene/acrylonitrile copolymer, a styrene/acrylic rubber/acrylonitrile copolymer, a styrene/alpha-methylstyrene copolymer, and a styrene/butadiene block copolymer.

At least one such thermoplastic resin can be used in combination with the polyphenylene ether.

The thermoplastic resin may be included in the resin matrix in an amount of preferably not more than 95%, especially preferably not more than 80%.

The elastomer which may be used in this invention is an elastomer in the ordinary sense. Accordingly, the elastomer in this invention, for example, includes polymers having a Young's modulus at ordinary temperature of $10^5$ to $10^9$ dynes/cm$^2$ (0.1 to 1020 kg/cm$^2$), the Young's modulus being defined at pages 71 to 78 of A. V. Tobolsky, "Properties and Structures of Polymers" (John Wiley & Sons, Inc., 1960).

Examples of such an elastomer include polybutadiene, polyisoprene, a nitrile rubber, an ethylene/propylene copolymer, an ethylene/propylene/diene copolymer (EPDM), polypentenamer, Thiokol rubbers, polysulfide rubbers, an acrylic rubber, a polyurethane rubber, a grafted product formed between a butyl rubber and polyethylene, polyester elastomers, and block copolymers, such as A-B-A' type block copolymers and A-B'-A' type block copolymers of diene compounds and vinyl aromatic compounds.

In the above A-B-A' type block copolymers and A-B'-A' type block copolymers, the terminal blocks A and A' are polymer chain blocks of the vinyl aromatic compounds. The central block B in the A-B-A' type block copolymers is a polymer chain block of a conjugated diene, and the central block B' in the A-B'-A' type block copolymers is a block resulting from the hydrogenation of a polymer chain block of a conjugated diene.

In the above description, the diene, diene compound and conjugated diene are used in the same sense, and may, for example, specifically represent 1,3-butadiene, 2,3-dimethylbutadiene, isoprene, 1,3-pentadiene or a mixture of these. The vinyl aromatic compound may, for example, denote styrene, alpha-methylstyrene, vinyltoluene, vinylxylene, ethylvinylxylene, vinylnaphthalene, or mixtures thereof.

Preferably, the aforesaid A-B-A' type block copolymers or A-B'-A' type block copolymers are used as the elastomer in this invention. The terminal blocks A and A' of these block copolymers preferably have a number average molecular weight of about 2,000 to about 100,000, and the central blocks B and B' preferably have a number average molecular weight of about 25,000 to about 1,000,000.

The elastomer may be included in the resin composition of this invention in an amount of preferably not more than 20% by weight, especially preferably not more than 10% by weight, based on the resin matrix.

In the polyphenylene ether resin composition of this invention, the polyphenylene ether may be included in an amount of at least 5% by weight, preferably at least 15% by weight, based on the resin matrix.

In the polyphenylene ether resin composition of this invention, the polyphenylene ether resin matrix composed of the polyphenylene ether alone or a mixture of it with the other polymer contains, dispersed therein, a diphosphonite of the following formula (I)

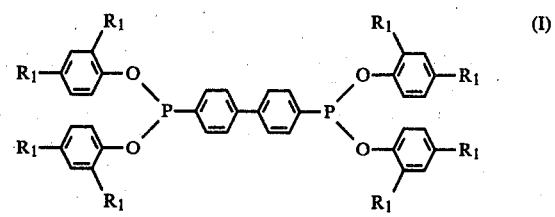

wherein $R_1$ groups are identical or different and each represents a linear or branched alkyl group having 1 to 10 carbon atoms, which serves to improve the heat stability of the polyphenylene ether.

The alkyl group for $R_1$ in the above formula (I) is a linear alkyl group such as methyl, ethyl, propyl, n-butyl, n-pentyl, n-hexyl, n-octyl, n-nonyl or n-decyl, and a branched alkyl group such as iso-propyl, iso-butyl, sec-butyl, tert-butyl, iso-amyl, or iso-octyl.

Examples of the diphosphate of formula (I) include tetrakis(2,4-di-tert.-butylphenyl)-4,4'-biphenylene diphosphonite, tetrakis(2,4-dimethylphenyl)-4,4'-biphenyllene diphosphonite, tetrakis(2,4-diethylphenyl)-4,4'-biphenylene diphosphonite, tetrakis(2,4-di-n-propylphenyl)-4,4'-biphenylene diphosphonite and tetrakis(2,4-di-isopropyl-phenyl)-4,4'-biphenylene diphosphonite. These diphosphonites can be produced, for example, by reacting 4,4'-biphenylene diphosphonous acid with the corresponding aromatic hydroxy compounds.

The diphosphonites of formula (I) used in this invention fall into the same category as organic phosphites previously used in that both contain a trivalent phosphorus atom. But the diphosphonites of formula (I) are characterized by the fact that because they have much higher hydrolysis resistance than the organic phosphites and possess high heat stability, they do not decompose at high temperatures and they scarcely dissipate by volatilization during molding.

The aforesaid characteristics of the diphosphonites used in this invention are specifically illustrated by taking up tetrakis(2,4-di-tert.-butylphenyl)-4,4'-biphenylene diphosphonite as an example. In a solution of this diphosphonite dissolved in 100 ml of a mixed solution (1:1 by volume) of benzene/glacial acetic acid in an amount corresponding to 1 mole calculated for one P-OR bond, it takes more than 5 hours for the diphosphonite to be completely hydrolyzed under strong acidity of pH 2.5. When distearyl pentaerythritol diphosphite, a kind of organic phosphite, is heated in the air at a rate of 6° C./min., its weight decrease is 5% at 215° C., 10% at 240° C., and 15% at 255° C. In contrast, when the above diphosphonite is heated under the same conditions, its weight decrease is 5% at 290° C., 10% at 300° C., and 15% at 340° C., thus showing an extremely low degree of dissipation by volatilization as compared with the former.

The diphosphonites may be added in an amount of about 0.01 to about 5 parts by weight, preferably about 0.05 to about 3 parts by weight, especially preferably about 0.1 to about 1 part by weight, per 100 parts by weight of the resin matrix in the resin composition of this invention.

Even when these compounds are used in amounts exceeding the above upper limits, the heat stability of the resulting resin composition is not corresponding improved. Rather, it is frequently deleterious on the properties of the resin composition, resulting in lowered heat distortion temperatures, for example, If the amount of the stabilizer compound is below the specified limit, the heat stability of the resin composition is not improved to the expected extent.

The resin composition of this invention shows better heat stability by dispersing both the above phosphonous acid or its ester and at least one sterically hindered phenol in the matrix resin. It is believed that the better heat stability is due to the synergistic action of the two kinds of stabilizer compounds.

Examples of sterically hindered phenols which can be effectively used in this invention include monohydric phenols such as 2,6-di-tert.-butyl-p-cresol, 2-tert.-butyl-4-methoxyphenol, 2,4-dinonylphenol, octadecyl-3-(3,5-di-tert.-butyl-4-hydroxyphenyl)propionate, diethyl 3,5-di-tert.-butyl-4-hydroxybenzylphosphonate, and 2-(3',5'-di-tert.-butyl-4'-hydroxyanilino)-4,6-dioctylthio-1,3,5-triazine; dihydric phenols such as 2,2'-methylenebis(4-methyl-6-tert.-butylphenol), 2,2'-methylenebis(4-ethyl-6-tert.-butylphenol), butylidenebis(methyl-butylphenol), 4,4'-thiobis(6-tert.-butyl-3-methylphenol), 1,1-bis(4-hydroxyphenyl)cyclohexane, 1,6-hexanediol-bis-3-(3,5-di-tert.-butyl-4-hydroxyphenyl)propionate, 2,2'-thiodiethyl-bis[3-(3,5-di-tert.-butyl-4-hydroxyphenyl)-propionate] and N,N'-hexamethylenebis (3,5-di-tert.-butyl-4-hydroxy-hydrocinnamide); trihydric phenols such as 1,3,5-tris(4-tert.-butyl-3-hydroxy-2,6-dimethylbenzyl) isocyanuric acid, 2,4,6-tris(3',5'-di-tert.-butyl-4'-hydroxybenzyl)-1,3,5-triazine, a triester of 3,5-di-tert.-butyl-4-hydroxyhydrocinnamic acid with 1,3,5-tris(2-hydroxyethyl-S-triazine-2,4,6-(1H,3H,5H)-trione) and 1,1,3-tris(2'-methyl-4'-hydroxy-5'-tert.-butyl-phenyl)butane; and tetrahydric phenols such as pentaerythrityl-tetrakis[3-(3,5-di-tert.-butyl-4-hydroxyphenyl)propionate].

The sterically hindered phenol may be included in the resin composition of this invention in an amount of about 0.05 to about 10 parts by weight, preferably about 0.1 to about 5 parts by weight, especially preferably about 0.5 to about 3 parts by weight, per 100 parts by weight of the matrix resin.

The resin composition of this invention may contain dispersed in the matrix an organic monophosphite or organic polyphosphite as well as the diphosphonite and the sterically hindered phenol in the resin matrix.

Examples of effective organic phosphites for use in this invention include organic monophosphites such as triphenyl phosphite, tricresyl phosphite, triisooctyl phosphite, tridecyl phosphite, tri-2-ethylhexyl phosphite, trioctadecyl phosphite, tri(octylphenyl) phosphite, tri(nonylphenyl) phosphite, tridodecylthio phosphite, phenyldiethyl phosphite, phenyl-di(2-ethylhexyl) phosphite, isooctyldiphenyl phosphite, diisooctyl-monophenyl phosphite and di-2-ethylhexyl)-mono(isooctylphenyl)phosphite; and organic polyphosphites such as a phosphite resin of hydrogenated bisphenol A. Among these organic phosphites, the organic polyphosphites are preferred. An organic monophosphite may be used in combination with an organic polyphosphite.

The organic phosphite may be included into the resin composition of this invention in an amount of about 0.05 to about 10 parts by weight, preferably about 0.1 to about 5 parts by weight, especially preferably about 0.5 to about 3 parts by weight, per 100 parts by weight of the resin forming the matrix.

The resin composition of this invention may further contain various additives depending upon the intended uses. Examples of the additives include lubricants, such as olefin waxes typified by polyethylene wax and polypropylene wax; phosphate-type fire retardants typified by triphenyl phosphate or tricresyl phosphate; bromine-type fire retardants typified by decabromobiphenyl, pentabromotoluene or decabromobiphenyl ether; pigments typified by titanium dioxide or zinc oxide; inorganic fillers typified by glass fibers, asbestos, wollastonite, mica or talc; and organic fillers typified by carbon fibers. The amount of these additives vary depending upon their types, but should be within the ranges which do not degrade the heat stability of the resin composition of this invention.

The resin composition of this invention can be easily produced by melt-mixing methods known with regard to thermoplastic resins. For example, it can be prepared conveniently by a method which comprises mixing the polyphenylene ether or a mixture of it with another polymer such as a thermoplastic resin or elastomer, with predetermined amounts of the phosphonous acid or its ester, and optionally the sterically hindered phenol and optionally the organic phosphite in a mixer, then kneading the mixture fully in a melt-extruder, and pelletizing the resulting homogeneous molten mixture.

The following Examples and Comparative Examples illustrate the resin composition of this invention more specifically. Unless otherwise specified, all parts and percentages in these examples are by weight.

EXAMPLES 1 TO 4 AND COMPARATIVE EXAMPLE 1

(1) Sixty (60) parts of a 2,6-dimethylphenol/2,3,6-trimethylphenol copolymer (the 2,3,6-trimethylphenol content 5 mole%) having an intrinsic viscosity, measured at 25° C. in chloroform, of 0.52 dl/g and 40 parts of a high-impact polystyrene (the polystyrene matrix having an intrinsic viscosity, measured at 25° C. in chloroform, of 0.80 dl/g; the gel content determined by using benzene as a solvent of 22.4%) were dissolved in 1000 parts of benzene while stirring them with an agitator. After the dissolving of the resin, about 2500 parts of methanol were added with stirring to precipitate the resin which was recovered. The recovered resin was separated by filtration, and washed with methanol. The resin was dried in the air at room temperature for 2 days, and further dried overnight at 60° C. under reduced pressure.

(2) Ten parts of the resulting mixture of the 2,6-dimethylphenol/2,3,6-trimethylphenol copolymer and the high-impact polystyrene was added to a solution of 0.1 part of tetrakis(2,4-di-tert.-butylphenyl)-4,4'-biphenylene diphosphonite in a suitable amount of ethanol. The mixture was slurried by agitation. It was dried in the air overnight and then further dried at 50° C. under reduced pressure for 8 hours (Example 1). The above procedure was repeated except that the amount of the diphosphonite was changed to 0.3 part (Example 2), 0.5 part (Example 3) and 0.7 part (Example 4).

(3) 1.5 Parts of each of the powdery mixtures was molded into cylindrical specimens under pressure. The test specimens were set in a heater of a Koka-type flow tester (a product of Shimadzu Seisakusho) maintained at 280° C., and allowed to stand for 6 minutes under a pressure of 30 kg/cm². Six minutes later, the heater was fully cooled, and the Hunter's whitenesses of the cylindrical specimens were measured by a color difference meter (Color Studio CS-K5F, a product of Nippon Denshoku Kogyo K.K.). The Hunter's whitenesses of the specimens which were left to stand for 30 minutes and 60 minutes respectively under heat were also measured. The results are tabulated below.

For comparison, test specimens were prepared in accordance with the procedures (1) to (3) under the same conditions as above except that tetrakis(2,4-di-tert.-butylphenyl)-4,4'-biphenylene diphosphonite was not added. The results are shown in the following table (Comparative Example 1).

| Heating time (minutes) | 6 | 30 | 60 |
| --- | --- | --- | --- |
| Example 1 | 24.6 | 19.6 | 20.2 |
| Example 2 | 25.4 | 21.1 | 18.7 |
| Example 3 | 26.3 | 22.4 | 19.3 |
| Example 4 | 26.8 | 23.3 | 19.6 |
| Comparative Example 1 | 21.6 | 18.9 | 14.9 |

The results in the above table show that the diphosphonite is effective for inhibiting coloration of the polyphenylene ether resin under heat.

EXAMPLE 5 AND COMPARATIVE EXAMPLE 2

Ten parts of the same 2,6-dimethylphenol/2,3,6-trimethylphenol copolymer as used in Example 1 and 0.1 part of the same diphosphonite as used in Example 1 were mixed in the same way as in Example 1. Subsequently, the mixture was subjected to the same operation as in Example 1, and the whitenesses of the specimens obtained were measured. The results are tabulated below.

For comparison, the above procedure was repeated except that the diphosphonite was not added. The results are also shown in the following table (Comparative Example 2).

| Heating time (minutes) | 6 | 30 | 60 |
| --- | --- | --- | --- |
| Example 5 | 17.9 | 14.4 | 15.1 |
| Comparative Example 2 | 12.4 | 11.8 | 12.4 |

The results show that the diphosphonite inhibits coloration of polyphenylene ether under heat.

EXAMPLE 6 AND COMPARATIVE EXAMPLE 3

(1) A solution of 60 parts of the same 2,6-dimethylphenol/2,3,6-trimethylphenol copolymer as used in Example 1 in 600 parts of benzene was fully mixed with a solution of 40 parts of a polystyrene/polybutadiene/polystyrene block copolymer (the weight ratio of the polystyrene block to the polybutadiene block 30:70; a 20% toluene solution of the copolymer had a viscosity, measured at 25° C. using a Brookfield Model RVT viscometer, of 1500 cps) in 400 parts of chloroform. About 2500 parts of methanol was added to the mixed solution to precipitate the resin, which was recovered. The recovered resin was filtered, washed, air-dried, and dried under reduced pressure under the same conditions as in Example 1, (1) and (2) to form a resin mixture.

The resulting mixture was subjected to the same operation as in Example 1, (3), and the whiteness of the molded product was measured. The results are tabulated below.

For comparison, the above procedure was repeated except that the diphosphonite was not added. The results are also shown in the following table (Comparative Example 3).

| Heating time (minutes) | 6 | 30 | 60 |
| --- | --- | --- | --- |
| Example 6 | 20.0 | 19.6 | 17.5 |
| Comparative Example 3 | 18.6 | 18.1 | 17.4 |

EXAMPLE 7 AND COMPARATIVE EXAMPLE 4

A powdery resin mixture was prepared in the same way as in Example 1 except that a solution of 40 parts of the same 2,6-dimethylphenol/2,3,6-trimethylphenol copolymer as used in Example 1 and 40 parts of the same high-impact polystyrene was used in Example 1 in 800 parts of benzene and a solution of 20 parts of the same polystyrene/polybutadiene/polystyrene block copolymer as used in Example 6 in 200 parts of chloroform were used.

The resulting resin mixture was subjected to the same operation as in Example 1, and the resulting product was examined for whiteness. The results are tabulated below.

For comparison, the above procedure was repeated except that the diphosphonite was not added. The results are also shown in the following table (Comparative Example 4).

| Heating time (minutes) | 6 | 30 | 60 |
| --- | --- | --- | --- |
| Example 7 | 42.6 | 36.7 | 31.3 |
| Comparative Example 4 | 38.7 | 31.1 | 27.0 |

EXAMPLE 8 AND COMPARATIVE EXAMPLE 5

Example 5 and Comparative Example 2 were each repeated except that poly(2,6-dimethyl-1,4-phenylene)ether having an intrinsic viscosity, measured at 25° C. in chloroform, of 0.56 dl/g was used as the polyphenylene ether resin. The results are tabulated below. It is seen that the diphosphonite is effective for inhibiting coloration of polyphenylene ether under heat.

| Heating time (minutes) | 6 | 30 | 60 |
| --- | --- | --- | --- |
| Example 8 | 16.4 | 15.3 | 14.9 |
| Comparative Example 5 | 11.6 | 11.1 | 10.5 |

EXAMPLE 9 AND COMPARATIVE EXAMPLE 6

(1) An autoclave was charged with 100 parts of ethylbenzene and 165 parts of poly(2,6-dimethyl-1,4-phenylene)ether having an intrinsic viscosity, measured at 25° C. in chloroform, of 0.55 dl/g, and they were heated to 125° C. with stirring. Then, 7 parts of di-tert.-butyl peroxide and 65 parts of styrene were added to the solution and reacted at 165° C. for 2 hours. The reaction mixture was withdrawn, and dried at 215° C. under reduced pressure for 2 hours to remove ethylbenzene and the unreacted styrene to afford styrene-grafted poly(2,6-dimethyl-1,4-phenylene)ether. The grafted copolymer had a polystyrene content of about 25%.

(2) The grafted copolymer was used as the polyphenylene ether, and otherwise the same operation as in Example 1 was repeated. The resulting cylindrical specimens were examined for Hunter's whiteness. The results are tabulated below.

| Heating time (minutes) | 6 | 30 | 60 |
|---|---|---|---|
| Example 9 | 21.2 | 17.3 | 16.5 |
| Comparative Example 6 | 18.4 | 15.1 | 13.8 |

EXAMPLE 10 AND COMPARATIVE EXAMPLES 7 AND 8

Sixty Parts of the same 2,6-dimethylphenol/2,3,6-trimethylphenol copolymer as used in Example 1, 37 parts of same high-impact polystyrene (the polystyrene matrix having an intrinsic viscosity, at 25° C. in chloroform, of 0.89 dl/g; the gel content analyzed by using methyl ethyl ketone as a solvent, 12.9%), 2 parts of the same polystyrene/polybutadiene/polystyrene block copolymer as used in Example 6, 1 part of an ethylene-/propylene copolymer (having a reduced specific viscosity, measured at 135° C. in decalin in a concentration of 0.1 g/100 ml, of 2.0 and a glass transition point of −49° C.), 5.8 parts of triphenyl phosphate, 7 parts of titanium dioxide and 1 part of tetrakis(2,4-di-tert.-butylphenyl)-4,4'-biphenylene diphosphonite were fully mixed in a Henschel mixer. The mixture was pelletized by a twin-screw extruder (AS-30, a product of Nakatani Kikai Seisakusho) in which the maximum temperature of the cylinders was set at 290° C. The resulting pellets were injection-molded under an injection pressure of 1050 kg/cm² using an injection molding machine (SJ-35B, a product of Meiki Seisakusho) in which the maximum temperature of the cylinder was set at 280° C. to prepare a test specimen (specimen A). Separately, the molten resin composition was left to stand for 60 minutes in the cylinder of the injection molding machine, and then injection-molded under the same condition as above to prepare a test specimen (specimen B). The Izod impact strengths of the two types of the specimens were measured, and the results are tabulated below.

For comparison, the above procedure was repeated except that the diphosphonite was not used. The results are also shown in the following table (Comparative Example 7).

For comparison, the above procedure was repeated except that instead of the diphosphonite, 1,1'-biphenyl-2,2'-diylphosphonite having the following formula

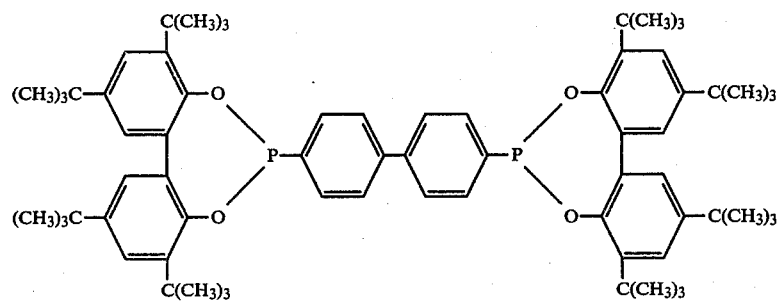

was used. The results are also shown in the following table (Comparative Example 8).

| | Izod impact strength (kg-cm/cm, notched) | |
|---|---|---|
| | Specimen A (before aging) | Specimen B (after aging) |
| Example 10 | 19.2 | 9.9 (52%) |
| Comparative Example 7 | 18.0 | 6.1 (34%) |

-continued

| | Izod impact strength (kg-cm/cm, notched) | |
|---|---|---|
| | Specimen A (before aging) | Specimen B (after aging) |
| Comparative Example 8 | 19.1 | 7.1 (37%) |

In the above and subsequent tables, the parenthesized figures show the percent retention calculated as follows:

$$\text{Retension (\%)} = \frac{\text{Izod impact strength after aging}}{\text{Izod impact strength before aging}} \times 100$$

It is seen from the results shown in the above table that the heat stability of the resin composition containing the diphosphonite shows further improvement.

EXAMPLE 11 AND COMPARATIVE EXAMPLES 9 AND 10

The various ingredients shown in Example 10 were fully mixed in a Henschel mixer except that the amount of the tetrakis (2,4-di-tert.-butylphenyl)-4,4'-biphenylene diphosphonite was changed to 0.4 part, and 0.36 part of 2-(3',5'-di-tert.-butyl-4'-hydroxyanilino)-4,6-dioctylthio-1,3,5-triazine ("Irganox 565") and 0.24 part of N,N'-hexamethylenebis(3,5-di-tert.-butyl-4-hydroxyhydrocinamide) ("Irganox 1098", were further added. The resulting mixture was pelletized by a twin-screw extruder (AS-30) a product of Nakatani Kikai Seisakusho) in which the maximum temperature of the cylinders was set at 290° C. The pellets were then injection-molded under an injection pressure of 1050 (kg/cm²) by an injection molding machine (SJ-35B, a product of Meiki Seisakusho) in which the maximum temperature of the cylinder was set at 280° C. to prepare a test specimen (⅛ inch thick). the resulting test specimen was aged in hot air at 115° C. for 20 days. The Izod impact strength of the specimen was measured before and after the aging, and the results are tabulated below.

For comparison, the above procedure was repeated except that the Irganox 565 and Irganox 1098 were not used and the diphosphonite was used in an amount of 1 part. The results are also shown in the following table (Comparative Example 9).

Furthermore, for comparison, the above procedure was repeated except that the diphosphonite was not used, and 0.6 part of the Irganox 565 and 0.4 part of the Irganox 1098 were used. The results are also shown in the following table (Comparative Example 10).

| | Izod impact strength (notched, kg-cm/cm) | |
|---|---|---|
| | Before aging | After aging |
| Example 11 | 20.1 | 10.8 (54%) |
| Comparative Example 9 | 19.2 | 6.2 (32%) |
| Comparative Example 10 | 18.5 | 8.2 (44%) |

It is seen from the above table that the joint use of the diphosphonite and the sterically hindered phenol synergistically improves the Izod impact strength of the molded product after aging in hot air, thus stabilizing the resin against high temperatures over a long period of time.

EXAMPLE 12

The procedure of Example 11 was repeated except that tetrakis-(2,4-di-tert.-butylphenyl)-4,4'-biphenylene diphosphonite and Irganox 565 were used as the stabilizer compounds in the amounts shown in the following table. The resulting test specimens were aged in hot air at 115° C. for 10 days. The Izod impact strengths of the test specimens were measured before and after the aging. The results are shown in the following table.

| Run No. | Amount of the diphosphonite (part) | Amount of the sterically hindered phenol (part) | Izod impact strength (notched, kg-cm/cm) | |
|---|---|---|---|---|
| | | | Before aging | After aging |
| 1 | 1.0 | 0 | 19.2 | 9.8 (51%) |
| 2 | 0.6 | 0.4 | 20.7 | 12.3 (59%) |
| 3 | 0.4 | 0.6 | 20.9 | 12.9 (62%) |
| 4 | 0.2 | 0.8 | 20.7 | 12.2 (59%) |

EXAMPLE 13

The procedure of Example 11 was repeated except that tetrakis (2,4-di-tert.-butylphenyl)-4,4'-biphenylene diphosphonite and 2,2'-methylenebis(4-methyl-6-tert.-butylphenol) were used as the stabilizer compounds in the amounts shown in the following table. The resulting test specimens were aged in hot air at 115° C. for 10 days. The Izod impact strengths of the specimens were measured before and after the aging, and the results are tabulated below.

| Run No. | Amount of the diphosphonite (part) | Amount of the sterically hindered (part) | Izod impact strength (kg-cm/cm, notched) | |
|---|---|---|---|---|
| | | | Before aging | After aging |
| 1 | 1.0 | 0 | 19.2 | 9.8 (51%) |
| 2 | 0.6 | 0.4 | 20.7 | 11.6 (56%) |
| 3 | 0.4 | 0.6 | 20.3 | 12.1 (60%) |
| 4 | 0.2 | 0.8 | 19.6 | 10.8 (55%) |

EXAMPLE 14

Example 11 was repeated using 42 parts of poly(2,6-dimethyl-1,4-phenylene)ether having an intrinsic viscosity, measured at 25° C. in chloroform, of 0.56 dl/g, 53.5 parts of the same high-impact polystyrene as used in Example 1, 3.5 parts of the same polystyrene/polybutadiene/polystyrene block copolymer as used in Example 6, 1 part of the same ethylene/propylene copolymer as used in Example 10, 7 parts of titanium dioxide, 0.4 part of tetrakis(2,4-di-tert.-butylphenyl)-4,4'-biphenylene diphosphonite and 0.6 part of 2,6-di-tert.-butyl-p-cresol. The resulting test specimens were aged in hot air at 115° C. for 10 days. The Izod impact strengths of the test specimens were measured before and after the aging. The results are tabulated below.

| Run No. | Amount of the diphosphonite (part) | Amount of the sterically hindered phenol (part) | Izod impact strength (notched, kg-cm/cm) | |
|---|---|---|---|---|
| | | | Before aging | After aging |
| 1 | 1.0 | 0 | 18.5 | 10.8 (58%) |
| 2 | 0.4 | 0.6 | 18.1 | 13.7 (76%) |

EXAMPLE 15 AND COMPARATIVE EXAMPLE 11

Sixty parts of the same 2,6-dimethylphenol/2,3,6-trimethylphenol copolymer as used in Example 1, 37 parts of the same high-impact polystyrene a used in Example 10, 2 parts of the same polystyrene/polybutadiene/polystyrene block copolymer as used in Example 6, 1 part of the same ethylene/propylene copolymer as used in Example 10, 5.8 parts of triphenyl phosphate, 7 parts of titanium dioxide, 0.4 part of tetrakis(2,4-di-tert.-butylphenyl)-4,4'-biphenylene diphosphonite, 0.4 part of hydrogenated bisphenol A.phosphite polymer and 0.6 part of 2,6-di-tert-butyl-p-cresol were fully mixed in a Henschel mixer. The mixture was pelletized by a twin-screw extruder (AS-30, a product of Nakatani Kikai Seisakusho) in which the maximum temperature of the cylinders was set at 290° C. The resulting pellets were left to stand for 60 minutes in the molten state in the cylinder of an injection molding machine (SJ-35B, a product of Meiki Seisakusho) in which the maximum temperature of the cylinder was set at 280° C., and then injection-molded under an injection pressure of 1050 kg/cm$^2$ to prepare a test specimen (⅛ inch thick).

For comparison, the above procedure was repeated except that 0.56 part of the hydrogenated bisphenol A.phosphite polymer and 0.84 part of 2,6-di-tert.-butyl-p-cresol were used instead of 0.4 part of tetrakis(2,4-di-tert.-butylphenyl)-4,4'-biphenylene diphosphonite, 0.4 part of hydrogenated bisphenol A.phosphite polymer and 0.6 part of 2,6-di-tert.-butyl-p-cresol.

In each run, a test specimen was prepared as above except that the pellets were not allowed to stand in the cylinder before injection.

The Izod impact strengths of the specimens were measured, and the results are tabulated below.

| | Izod impact strength (notched; kg-cm/cm) | |
|---|---|---|
| | Without standing | After 60 minute standing |
| Example 15 | 20.9 | 8.4 (40%) |
| Comparative Example 11 | 19.6 | 6.4 (33%) |

EXAMPLE 16 AND COMPARATIVE EXAMPLE 12

Example 15 was repeated except that the amount of the tetrakis(2,4-di-tert.-butylphenyl)-4,4'-biphenylene diphosphonite was changed to 1.2, the amount of the hydrogenated bisphenol A.phosphite polymer was changed to 0.32 part, and 0.48 part of 2,2'- methylenebis(4-methyl-6-tert.-butylphenol) was used instead of the 2,6-di-tert.-butyl-p-cresol.

For comparison, the above procedure was repeated except that 0.8 part of hydrogenated bisphenol A.-phosphite polymer and 1.2 parts of 2,2'-methylenebis(4-methyl-6-tert.-butylphenol) were used instead of the aforesaid three stabilizer compounds.

The Izod impact strengths of the specimens obtained with or without standing during the injection molding were measured, and the results are tabulated below.

|  | Izod impact strength (notched; kg-cm/cm) | |
|---|---|---|
|  | Without standing | After 60 minutes standing |
| Example 16 | 19.8 | 10.9 (55%) |
| Comparative Example 12 | 21.2 | 7.4 (35%) |

EXAMPLE 17 AND COMPARATIVE EXAMPLE 13

Thirty nine parts of poly(2,6-dimethyl-1,4-phenylene)ether having an intrinsic viscosity, measured at 25° C. in chloroform, of 0.54 dl/g, 59 parts of the same high-impact polystyrene as used in Example 15, 2 parts of the same polystyrene/polybutadiene/polystyrene block copolymer as used in Example 15, 10.5 parts of triphenyl phosphate, 7 parts of titanium dioxide, 0.8 part of tetrakis(2,4-di-tert.-butylphenyl)-4,4'-biphenylene diphosphonite, 0.28 part of hydrogenated bisphenol A.phosphite polymer and 42 parts of 2-(3',5'-di-tert.-butyl-4'-hydroxyanilino)-4,6-dioctylthio-1,3,5-triazine were fully mixed in a Henschel mixer. The mixture was pelletized by a twin-screw extruder (AS-30, used in Example 10) in which the maximum temperature of the cylinders was set at 280° C. The resulting pellets were left to stand in the molten state for 60 minutes in the cylinder of an injection molding machine (SJ-35B, used in Example 10) in which the maximum temperature of the cylinder was set at 240° C., and then injection-molded under an injection pressure of 1050 kg/cm² to prepare a test specimen.

For comparison, the above procedure was repeated except that the diphosphonite was not used, and 0.6 part of hydrogenated bisphenol A.phosphite polymer and 0.9 part of 2-(3',5'-di-tert.-butyl-4'-hydroxyanilino)-4,6-dioctylthio-1,3,5-triazine were used as the stabilizer compounds (Comparative Example 13).

The Izod impact strengths of the test specimens obtained with or without standing during the injection molding were measured. The results are tabulated below.

|  | Izod impact strength (notched, kg-cm/cm) | |
|---|---|---|
|  | Without standing | After 60 minutes standing |
| Example 17 | 11.8 | 11.5 (97%) |
| Comparative Example 13 | 10.5 | 8.9 (85%) |

EXAMPLE 18 AND COMPARATIVE EXAMPLE 14

55 Parts of the same 2,6-dimethylphenol/2,3,6-trimethylphenol copolymer as used in Example 15, 42 parts of the same high-impact polystyrene as used in Example 15, 2 parts of the same polystyrene/polybutadiene/polystyrene block copolymer as used in Example 15, 1 part of the same ethylene/propylene copolymer as used in Example 15, 15 parts of triphenyl phosphate, 5 parts of titanium dioxide, 0.4 part of tetrakis(2,4-di-tert-butylphenyl)-4,4'-biphenylene diphophonite, 0.4 part of tricresyl phosphite and 0.6 part of pentaerythrity-tetrakis[3-(3,5-di-tert.-butyl-4-hydroxyphenyl)propionate] were fully mixed in a Henschel mixer. The mixture was pelletized by a twin-screw extruder (AS-30, used in Example 10) in which the maximum temperature of the cylinder was set at 290° C. The resulting pellets were left to stand in the molten state for 60 minutes in the cylinder of an injection molding machine (SJ-35B, used in Example 10) in which the maximum temperature of the cylinder was set at 240° C., and then injection-molded under an injection pressure of 1050 kg/cm² to prepare a test specimen for measurement of Izod impact strength.

For comparison, the above procedure was repeated except that the diphosphonite was not used, and 0.56 part of tricresyl phosphite and 0.84 part of pentaerythrityltetrakis[3-(3,5-di-tert.-butyl-4-hydroxyphenyl)-propionate] were used as the stabilizer compounds (Comparative Example 14).

The Izod impact strengths of the test specimens obtained with or without standing during the injection molding were measured, and the results are tabulated below.

|  | Izod impact strength (notched, kg-cm/cm) | |
|---|---|---|
|  | Without standing | After 60 minute standing |
| Example 18 | 23.2 | 21.8 (94%) |
| Comparative Example 14 | 22.5 | 19.1 (85%) |

EXAMPLE 19 AND COMPARATIVE EXAMPLE 15

The following two stabilizers were used.

Tetrakis(2,4-di-tert.-butylphenyl)-4,4'-biphenylene diphosphonite (hereinafter called a stabilizer A):

1,1'-Biphenyl-2,2'-diylphosphonite of the following formula (hereinafter called a stabilizer B):

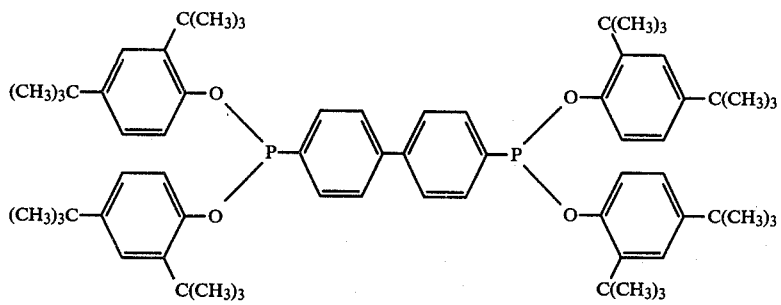

15

The stabilizer B was prepared as follows. 40.4 g of triethylamine and 32.8 g of 3,3',5,5'-tetra-tert.-butyl-2,2'-dihydroxyl-1,1'-biphenyl were dissolved in 20 ml of dry benzene. 14.16 g of 4,4'-diphenyl-bis(dichlorophosphine) was added dropwise to the resultant solution for 10 minutes. During that time, the solution was held at 30° C. After the addition, 100 ml of dry benzene was added to the obtained reaction mixture, and the reaction was conducted under stirring at 30° C. for 20 minutes and then at 65° to 70° C. for 4 hours. The reaction mixture was filtered in order to remove precipitated triethylamine hydrochloride. Benzene was distilled off from the clear filtrate and a volatile component was then removed in vacuo to isolate the product. The resultant residue was recrystallized using a mixed solution containing 300 ml of acetonitrile and 100 ml of ethyl acetate. In consequence, the stabilizer B was obtained as a white crystal.

A solution of a given amount of each of the said stabilizers in acetone was prepared. A predetermined amount of this solution was taken (in such an amount that the stabilizer is present in proportions given in the following Table) and stirred by addition of 10 parts by weight of the same 2,6-dimethylphenol/2,3,6-trimethylphenol copolymer as used in Example 1 to give a slurry. The slurry obtained was dried with air overnight and then further dried at 50° C. under reduced pressure for 8 hours whereby a powdery mixture was obtained. A cylindrical sample (1 cm² in cross-sectional area and 1.5 cm in height) was prepared by pressure molding from 1.5 parts by weight of the powdery mixture obtained. The cylindrical sample obtained was subjected to heating tests at two different temperature conditions of 280° C. and 300° C. That is, the cylindrical sample obtained was packed in a heater of the Koka type flow tester held at the above temperatures and maintained under a pressure of 30 kg/cm² for 60 minutes. After 60 minutes the heater was thoroughly cooled and the sample was taken out. Samples so obtained were each transparent and were unsuited for measurement of the whiteness degree and because of this, they were tested for lightness values. A color difference meter (Color Studio CS-K5F, a product of Nippon Denshoku Kogyo K.K.) was used for measurement of lightness values.

The above test was conducted on the respective samples shown in the following Table and test results obtained were also shown in the same Table.

| Run No. | Sample | Amount of stabilizer Incorporated (PHR) | Heat treatment conditions 280° C.-60 minutes | 300° C.-60 minutes |
|---|---|---|---|---|
| 1 | Polyphenylene ether resin alone | none | 1.00 | 1.00 |
| 2 | Substance incorporated with the stabilizer A of the present invention | 1 | 1.09 | 1.10 |
| 3 | Substance incorporated with the stabilizer A of the present invention | 2 | 1.25 | 1.14 |
| 4 | Substance incorporated with the comparative stabilizer B | 1 | 1.04 | 1.03 |
| 5 | Substance incorporated with the comparative stabilizer B | 2 | 1.10 | 1.05 |

Values given in Table 1 used, as the standard (1), lightness value of polyphenylene ether resin (containing no stabilizers) for facilitation of their comparison. In the case, therefore, of lightness value being greater than 1 it shows the lowering of lightness value to have been inhibited by the incorporation of stabilizer.

What we claim is:

1. A polyphenylene ether resin composition having improved heat stability and good color, said composition comprising a polyphenylene ether resin matrix, and dispersed therein, a diphosphonite of the formula

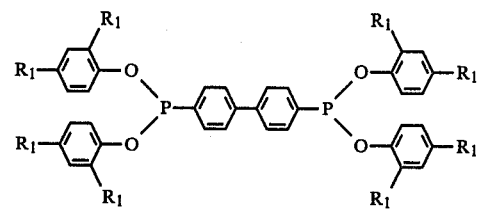

wherein $R_1$ groups are identical or different and each represents a linear or branched alkyl group having 1 to 10 carbon atoms.

2. The composition of claim 1 which further comprises at least one sterically hindered phenol in the polyphenylene ether resin matrix.

3. The composition of claim 1 wherein the polyphenylene ether constituting the matrix is a polyphenylene ether homopolymer or copolymer obtained by polycondensing at least one mononuclear phenol of the formula

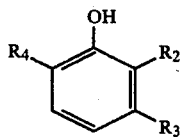

wherein $R_2$, $R_3$ and $R_4$, independently from each other, represent a hydrogen atom or an alkyl group having 1 to 3 carbon atoms, provided that at least one of $R_2$ and $R_4$ is an alkyl group having 1 to 3 carbon atoms, or a grafted polyphenylene ether obtained by graft-copolymerizing said polyphenylene ether with a vinyl aromatic compound.

4. The composition of claim 3 wherein the vinyl aromatic compound is selected from the group consisting of styrene, alpha-methylstyrene, vinyltoluene and vinylxylene.

5. The composition of claim 1 wherein the polyphenylene ether resin constituting the matrix is poly(2,6-dimethyl-1,4-phenylene)ether, a polyphenylene ether copolymer derived from 2,6-dimethylphenol and 2,3,6-trimethylphenol copolymer, or a grafted polyphenylene ether obtained by grafting styrene to any of said polyphenylene ethers.

6. The composition of claim 1 wherein the polyphenylene ether resin matrix is a mixture of a polyphenylene ether with another polymer.

7. The composition of claim 6 wherein the other polymer is a thermoplastic resin containing at least 25% by weight of a recurring structural unit of the formula

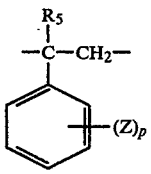

wherein $R_5$ represents a hydrogen atom or a lower alkyl group, Z represents a halogen atom or a lower alkyl group, and p is 0 or a positive integer of 1 to 3, in the polymer chain.

8. The composition of claim 6 wherein the other polymer is an elastomer having a Young's modulus at ordinary temperature of $10^5$ to $10^9$ dynes/cm$^2$.

9. The composition of claim 8 wherein the elastomer is an elastomeric block copolymer of the type A-B-A' wherein A and A' represent a polymer chain block of a vinyl aromatic compound and B represents a polymer chain block of a conjugated diene, or the type A-B'-A' wherein A and A' are as defined above, and B' represents a hydrogenated polymer chain block of a conjugated diene.

10. The composition of claim 9 wherein the vinyl aromatic compound is selected from the group consisting of styrene, alpha-methylstyrene, vinyltoluene, vinylxylene, ethylvinylxylene, vinylnaphthalene and mixtures thereof.

11. The composition of claim 9 wherein the conjugated diene is selected from the group consisting of 1,3-butadiene, 2,3-dimethylbutadiene, isoprene, 1,3-pentadiene and mixtures thereof.

12. The composition of claim 6 wherein the amount of the polyphenylene ether is at least 5% by weight of the resin matrix.

13. The composition of claim 1 wherein the amount of the diphosphonite is 0.01 to 10 parts by weight per 100 parts by weight of the polyphenylene ether resin matrix.

14. The composition of claim 2 wherein the amount of the sterically hindered phenol is 0.05 to 10 parts by weight per 100 parts by weight of the polyphenylene ether resin matrix.

* * * * *